United States Patent [19]

Loeb

[11] 4,193,267
[45] Mar. 18, 1980

[54] METHOD AND APPARATUS FOR GENERATING POWER UTILIZING PRESSURE-RETARDED OSMOSIS

[75] Inventor: Sidney Loeb, Warrenton, Va.

[73] Assignee: Ben-Gurion University of the Negev Research & Development Authority, Beersheba, Israel

[21] Appl. No.: 877,989

[22] Filed: Feb. 15, 1978

[30] Foreign Application Priority Data

Feb. 25, 1977 [IL] Israel .......................................... 51541

[51] Int. Cl.² ............................................. F01K 25/06
[52] U.S. Cl. ......................................... 60/649; 60/673; 290/1 R
[58] Field of Search .......................... 60/649, 673, 721; 290/1 R

[56] References Cited

U.S. PATENT DOCUMENTS

| 3,587,227 | 6/1971 | Weingarten | 60/721 X |
| 3,906,250 | 9/1975 | Loeb | 60/649 X |
| 3,978,344 | 8/1976 | Jellinek | 60/649 X |

*Primary Examiner*—Allen M. Ostrager
*Assistant Examiner*—Stephen F. Husar
*Attorney, Agent, or Firm*—Benjamin J. Barish

[57] ABSTRACT

A method and apparatus are described for generating power utilizing pressure-retarded osmosis, in which a concentrated solution at a high hydraulic pressure is passed along one face of a semi-permeable membrane, and a dilute solution at a low hydraulic pressure is passed along the opposite face of the membrane to effect, by pressure-retarded-osmosis, the passage of at least a part of the dilute solution through the membrane forming a pressurized mixed solution. The potential energy stored in the pressurized mixed solution is converted to useful energy by depressurizing and repressurizing only the dilute solution.

15 Claims, 6 Drawing Figures

METHOD AND APPARATUS FOR GENERATING POWER UTILIZING PRESSURE-RETARDED OSMOSIS

BACKGROUND OF THE INVENTION

The present invention relates to a method and apparatus for generating power utilizing pressure-retarded osmosis. More particularly, the present invention is directed to variations and improvements in the method and apparatus disclosed in our prior U.S. Pat. No. 3,906,250.

The above patent discloses a method and apparatus for producing energy from the free energy of mixing by utilizing pressure-retarded osmosis. More particularly, the method and apparatus are characterized by the steps of, and means for, introducing at a high hydraulic pressure a first liquid, constituting a concentrated solution, of a high osmotic pressure into a first pathway which is at least partially defined by one face of a semi-permeable membrane; introducing at a lower hydraulic pressure a second liquid, constituting a dilute solution, of a lower osmotic pressure into a second pathway which is at least partially defined by the opposite face of the semi-permeable membrane; maintaining the hydraulic pressures of the liquids on the opposite faces of the membrane at a pressure difference which is less than the osmotic pressure difference between the liquids to affect, by Pressure-Retarded-Osmosis (hereinafter sometimes referred to as "PRO"), the passage of at least a part of the dilute solution through the semi-permeable membrane, forming a pressurizing mixed solution of greater volume than the concentrated solution introduced into the first pathway; and converting the potential energy stored in the pressurized mixed solution to useful energy.

In the preferred embodiments of the invention described in the above patent, the potential energy stored in the mixed solution is converted by depressurizing the mixed solution, the concentrated solution having been pressurized before being introduced into the first pathway through the semi-permeable membrane. As an example, the converting means could be a hydroturbine generating electrical power. Thus, the net output of energy from the system described would be equal to the difference between the output from the hydroturbine and the input to the pressurizing pump for pressurizing the concentrated solution.

If pressurizing pumps and hydroturbines were to have 100% efficiency, this pressurization-depressurization sequence of the concentrated solution would have no effect on energy production. However, in practice, all pumps and hydroturbines have less than 100% efficiency, and therefore considerable energy is wasted in pressurizing the concentrated solution and depressurizing the mixed solution when only a small volume of the mixed solution (that permeated through the semi-permeable membrane) contributes to the net output generated. This drawback is made even more serious to lowcost power generation by the use of the PRO technique since, on the one hand, the mechanical efficiency decreases with increasing pressure of the concentrated solution, and on the other hand, energy costs decrease with increasing pressure.

BRIEF SUMMARY OF THE INVENTION

An object of the present invention is to provide a method and apparatus for generating power utilizing the PRO technique and having advantages in the above respects.

Broadly, the present invention is characterized by converting the potential energy stored in the pressurized mixed solution to useful energy by depressurizing and repressurizing only the dilute solution. More particularly, this is done by the steps of, and the means for: (i) pressurizing a quantity of liquid taken as a flushing solution from the second pathway at a point downstream of the semi-permeable membrane and adding same to the pressurized mixed solution, (ii) thermally separating said pressurized mixed and flushing solutions to regenerate said concentrated and dilute solutions while both are pressurized; (iii) recycling said pressurized, regenerated concentrated solution back through said first pathway; (iv) depressurizing said pressurized, regenerated dilute solution to produce useful energy; and (v) recycling the depressurized dilute solution back through said second pathway.

Thus, the pressurization-depressurization sequence occurs, not in the large-volume concentrated solution and mixed solution, respectively, but rather in the small-volume flushing solution and dilute solution, respectively. Accordingly, mechanical efficiency does not play as a large factor in the production cost of the energy, and therefore the energy costs in a practical system can be substantially reduced.

In addition, since the dilute solution contains some non-permeable material (i.e., solute), using a quantity of the dilute solution as a flushing solution which is directed to the thermal separator unit and included in the regenerated dilute solution recycled back to the semi-permeable membrane, prevents a build-up of such non-permeable material in the dilute solution pathway through the semi-permeable membrane unit. The required concentration in the regenerated dilute solution may be obtained by suitably controlling the separator, or by adding the appropriate amount of regenerated concentrated solution to the regenerated dilute solution after the thermal separation.

In the preferred embodiments of the invention described below, no pressurizing pump is used on the concentrated solution. The high hydraulic pressure is achieved and maintained primarily by permeation of most of the solvent of the dilute solution into the concentrated-solution. The concentrated solution, by itself or as a component of the mixed solution, is always approximately at the high hydraulic pressure; and the separation carried on the mixed and flushing solutions is done entirely at the high hydraulic pressure.

While it is necessary, in these described embodiments, to use a pressurizing pump on the flushing solution, the flushing solution volume is very small compared to the dilute solution volume, and therefore small compared to the concentrated solution volume. Accordingly, the energy consumed by pressurization of the flushing solution is not an important factor. Also, a circulating pump used on the pressurized concentrated solution consumes a small amount of energy which is also not an important factor in the net energy output of the overall system.

The separation of the mixed solution into the regenerated concentrated and dilute solutions which are recycled back into the semi-permeable membrane unit through their respective paths, is preferably effected by one of the thermal separation, or unmixing, techniques described in U.S. Pat. No. b 3,906,250. A number of such techniques are therein described according to the nature of the intermediate phases in the unmixing. For purposes of example, the embodiments of the present invention described below include similar thermal unmixing techniques, namely by using, for the concentrated and dilute solutions: (1) two partially-miscible liquids whose miscibility is a function of temperature; (2) a liquid and a solid whose solubility in the liquid is a function of temperature; and (3) a liquid and a vapour, the separation being effected by distillation.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF PREFERRED EMBODIMENTS

Figure 1:
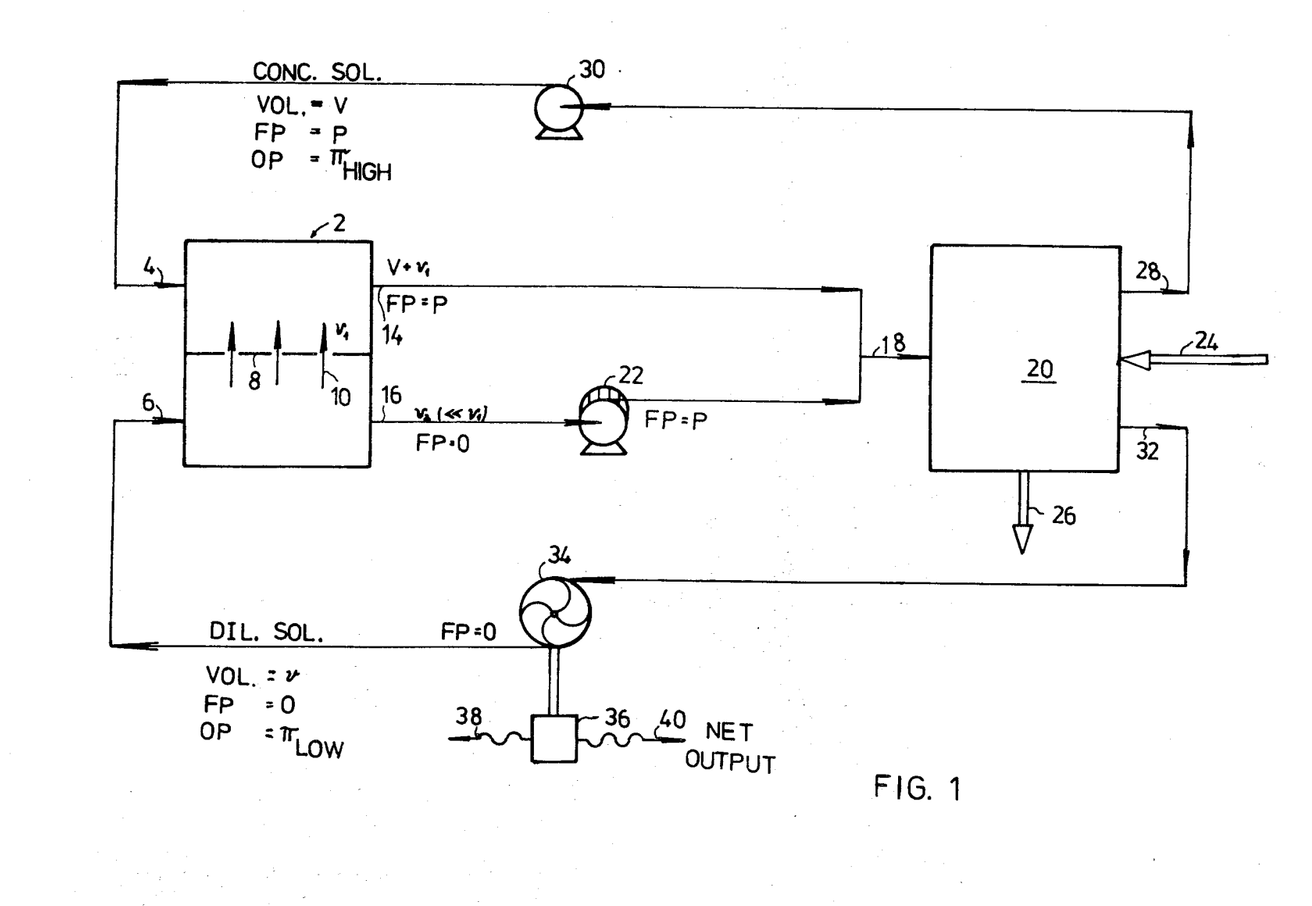
FIG. 1 illustrates the generalized concept of a Pressure-Retarded-Osmosis (PRO) heat-engine constructed in accordance with the present invention.

With reference to FIG. 1 illustrating the generalized concept of the improved PRO heat-engine in accordance with the invention, the heat-engine therein illustrated includes a PRO membrane unit, generally designated 2, having two pathways therethrough, indicated by the two inlets 4 and 6 respectively. These two pathways are defined by opposite faces of a semi-permeable membrane 8 which permits the permeation of solvent in one direction, as indicated by the arrows 10. A concentrated solution (volume V) of a high osmotic pressure ($\pi$high) is introduced into inlet 4 at a high hydraulic pressure (P); and a dilute solution (volume $v$) of a lower osmotic pressure ($\pi$low) is introduced into inlet 6 at a lower hydraulic pressure (P=0). As described in the above-cited Patent Specification, the solutions on the opposite faces of membrane 8 are maintained at a hydraulic pressure difference which is less than the osmotic pressure difference between the two solutions; accordingly, there is effected, by Pressure-Retarded-Osmosis (PRO), the passage of a part ($v_1$) of the dilute solution, principally the solvent, through the semi-permeable membrane 8, thereby forming a pressurized mixed solution at outlet 14 of the PRO unit 2, which pressurized mixed solution has a greater volume (V+$v_1$) than that (V) of the concentrated solution introduced into the PRO membrane unit via inlet 4, and the same pressure (P) as that of the concentrate concentrated solution introduced into inlet 4 of the PRO membrane unit. This pressurized mixed solution is fed via line 14 into the inlet 18 of a pressurized thermal unmixing unit, generally designated 20.

A small fraction ($v_2 < < v_1$) of the original dilute solution emerges via outlet 16 from the low-pressure side of the PRO membrane unit 2, is pressurized by means of a pump 22 (to P), and is then added to the pressurized mixed solution from outlet 14 before the latter is introduced into the thermal unmixing unit 20 via inlet 18.

The pressurized mixed solution and the flushing solution entering the thermal unmixing unit 20 are unmixed or separated into the concentrated and dilute solutions by heat absorption from a heat source 24, or by heat rejection to a heat sink 26. The separation is effected without a significant change in the hydraulic pressure, i.e., at the high hydraulic pressure (P) of the concentrated solution at inlet 4. The concentrated solution leaves the thermal unmixing unit 20 via outlet 28 (volume V) and is recycled by circulation pump 30 to the high pressure inlet 4 of the PRO membrane unit 2; whereas the dilute solution leaves the thermal unmixing unit 20 via outlet 32 (volume $v$), is depressurized by a hydroturbine 34 (to P=0), and is then recycled back to the low pressure inlet 6 of the PRO membrane unit 2.

The hydroturbine 34 drives a generator 36 which supplies energy (via the schematically-shown output line 38) to drive the pressurizing pump 22 and also the circulation pumps 30, thereby producing a net output of useful energy (schematically-shown by output line 40) equal to the energy generated by depressurizing the dilute solution less the energy expended in driving the pressurizing pump 22 and the circulation pump 30.

The system of FIG. 1 thus fits in every respect the definition of a heat-engine, i.e. a man-made device which makes it possible for a working substance to undergo a cyclic process in the conversion of heat to work. As in any heat-engine, heat must be both absorbed and rejected. Assuming, for example, that thermal unmixing in unit 20 occurs by heat absorption, heat rejection must then also occur at some appropriate place in the heat-engine, as will be shown in the other embodiments of the invention described below. However, for purposes of clarity, heat absorption and rejection are both represented in FIG. 1 as occurring only at the thermal unmixing unit 20.

The above described PRO heat-engine possess an important advantage over the presently used heat-engines, such as the vapour power cycle engine. In the vapour power cycle engine, heat absorption and rejection are intimately associated with the work-producing part of the cycle. However, in the above-described PRO heat-engine, heat absorption and rejection are utilized only for thermal unmixing. Since thermal unmixing can take place at relatively low temperature differences, the PRO heat-engines can use low temperature heat sources, such as unconcentrated solar energy, geothermal energy, and waste heat. This constitutes an important advantage over other heat-engines which cannot use such low temperature heat sources.

Figure 2:
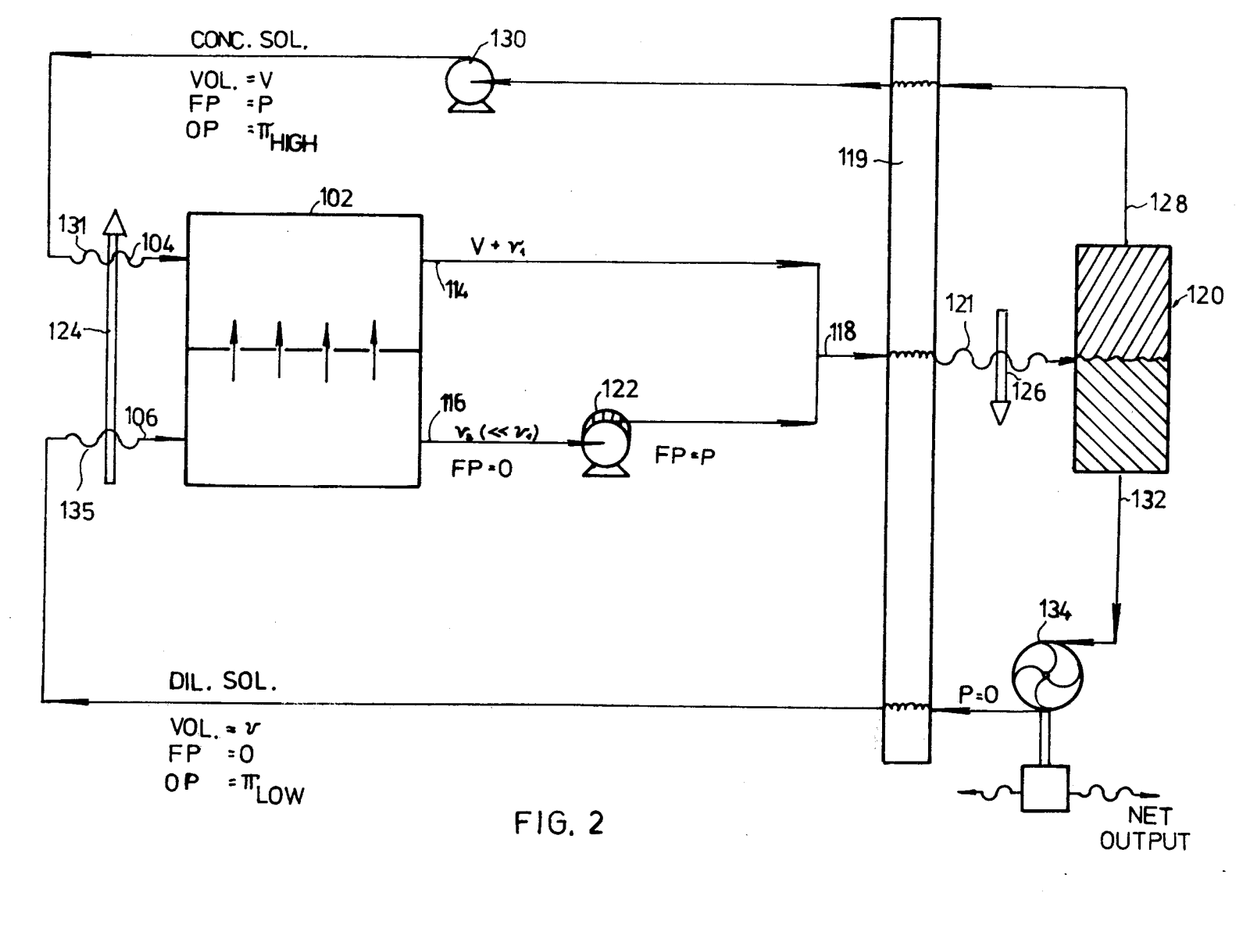
FIG. 2 illustrates an example of a PRO heat-engine constructed in accordance with the invention utilizing thermal unmixing by separation into two liquid phases, or into a solid phase and a liquid phase.

FIG. 2 illustrates an embodiment of the invention wherein unmixing or separation of the two solutions is effected by cooling, to form two liquid phases of liquids whose miscibility is a function of temperature, or to form a liquid phase and a solid phase whose solubility in the liquid is a function of temperature. Examples of materials that may be used are described in the above-cited U.S. Patent.

Thus, in the heat-engine of FIG. 2, the concentrated solution (V) having a high osmotic pressure ($\pi_{HIGH}$) is introduced into the PRO membrane unit 102 at a high hydraulic pressure (P) via inlet 104; and the dilute solution ($v$) of a lower osmotic pressure ($\pi_{LOW}$) is introduced at a lower hydraulic pressure (P=0) via inlet 106. The pressurized mixed solution containing the concentrated solution (V) and the permeated portion ($v_1$) of the dilute solution exits from the PRO membrane unit 102 via the high pressure outlet 114. A small fraction ($v_2 << v_1$) of the dilute solution, constituting the flushing solution, exits via the low pressure outlet 116, whereupon it is pressurized by pump 122 and is then added to the pressurized mixed solution at point 118. The pressurized mixed and flushing solutions then pass through a heat-exchanger 119 where they are partially cooled, and then pass through a cooler 121 where they are finally cooled to the minimum temperature in the system, the cooler involving heat rejection as shown by arrow 126 to a heat sink.

In one embodiment of the invention, two pressurized liquid phases are thus formed, constituting the concentrated solution and the dilute solution, respectively, the two solutions being separated in separator 120. The concentrated solution exits from separator 120 via outlet 128, passes first through heat-exchanger 119 where it is partially heated, then through circulating pump 130, and finally through a heater 131 where it is heated by heat source 124 to its maximum temperature before being recycled back into the high pressure inlet 104 of the PRO membrane unit 102. The dilute solution exits from separator 120 via outlet 132, is depressurized (P=0) by hydroturbine 134, then passes through heat-exchanger 119 where it is partially heated, and then through heater 135 where it is heated by the heat source 124 to its maximum temperature before entering the PRO membrane unit 102 via the low pressure inlet 106.

The power produced by the heat-engine of FIG. 2 is derived from the hydroturbine 134, and the net output of the engine is equal to the output of the hydroturbine less the energy supplied to the pressurizing pump 122 and the circulating pump 130, as described above with respect to FIG. 1 The use of the heat-exchanger 119 in the system of FIG. 2, for transferring heat between the four streams in the process, increases the thermal efficiency of the system.

Figure 2A:
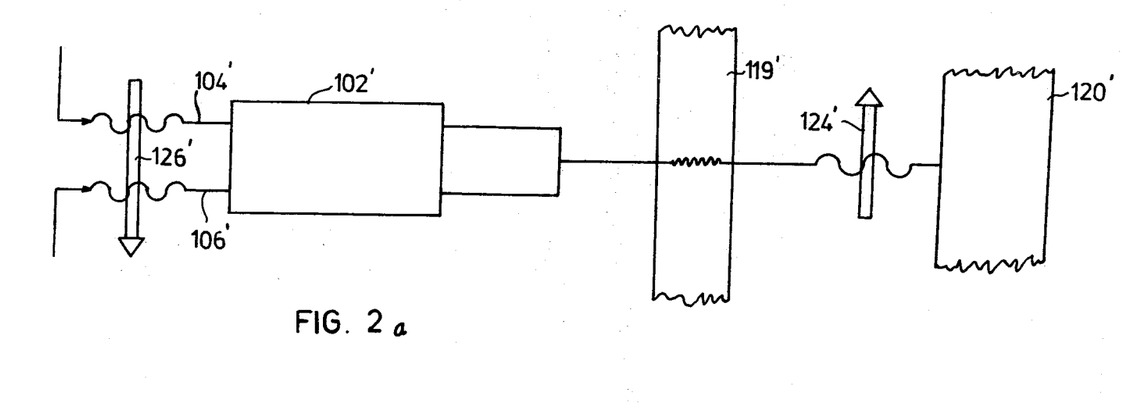
FIG. 2a illustrates a variation in the heat-engine of FIG. 2.

It will be appreciated that certain partially miscible liquid mixtures can be thermally unmixed by heating rather than by cooling, as described for example in U.S. Pat. No. 3,906,250. For such mixtures, the process would be the same as shown in FIG. 2, except that the heat source (124) and the cooler (121) would be interchanged, whereupon the separator unit (120) would operate at the maximum temperature, and the PRO membrane unit (102) would operate at the minimum temperature. This modification is illustrated in FIG. 2a, wherein it will be seen that the heat souce 124' heats the pressurized mixed solution leaving the heat-exchanger 119' (wherein it is pre-heated rather than pre-cooled) before the mixed solution is introduced into the separator 120'; and the separated dilute and concentrated solutions are cooled, by cooler 126', before being recycled back into the two inlets 104' and 106' of the PRO membrane unit 102'.

The same system as illustrated in FIG. 2 could be used where thermal unmixing is effected by separating into a liquid and a solid phase, by using a solute whose solubility is a function of temperature. In such case, the concentrated solution exiting from the separator 120 via outlet 128 would be a slurry, i.e. a mixture of solid solute and liquid, which slurry would be partially dissolved by heating in the heat-exchanger 119, and finally dissolved in the heater 131 by the heat souce 124 before entering the high-pressure inlet 104 of the PRO membrane unit 102.

An example of a liquid-liquid phase separation system would be methanol-hexane, and an example of a liquid-solid phase separation system would be potassium-nitrate-water.

Figure 3:
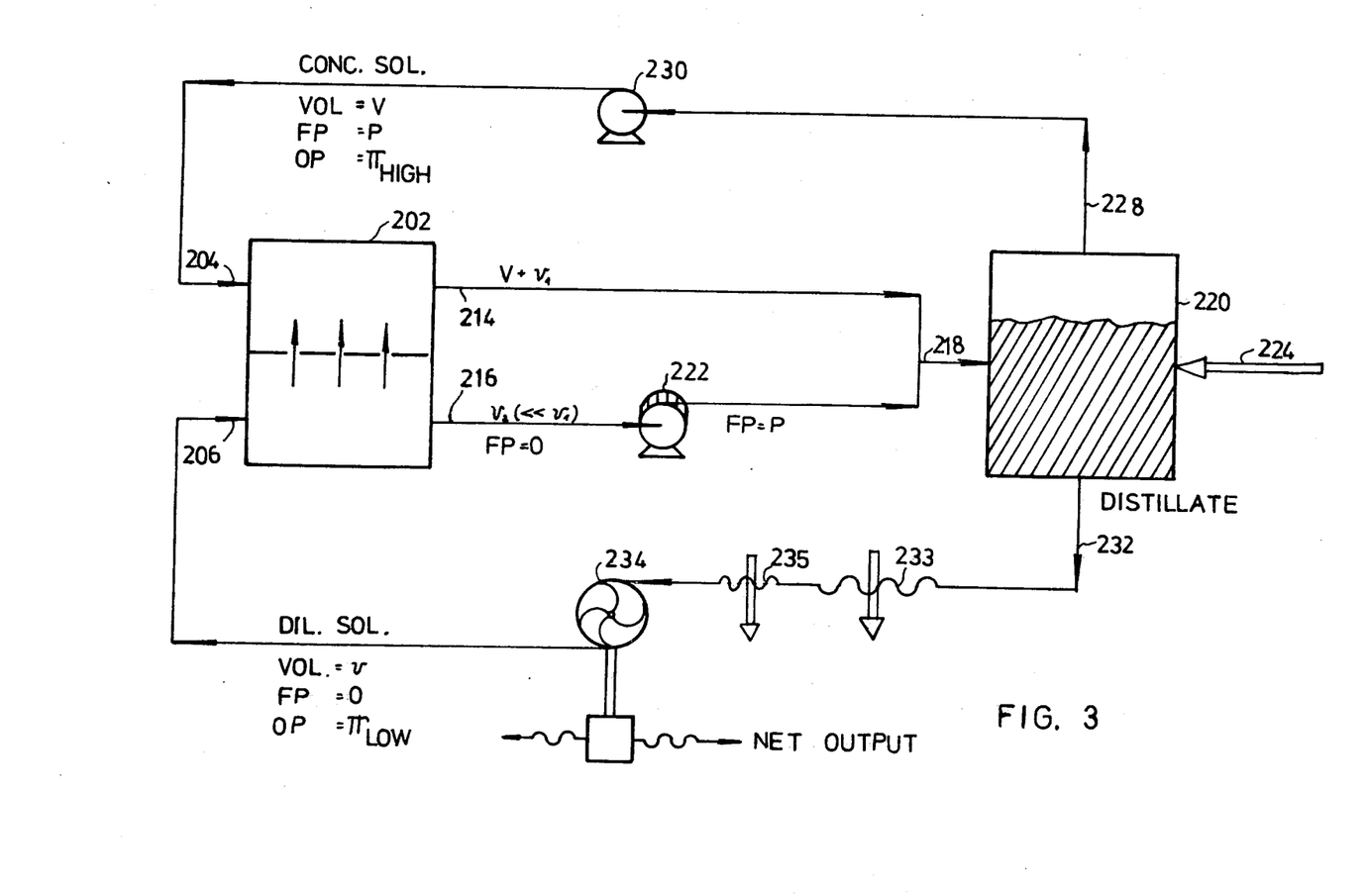
FIG. 3 illustrates an example of a PRO heat-engine in accordance with the invention utilizing thermal unmixing by distillation.

FIG. 3 illustrates a variation wherein the thermal unmixing is effected by separation into a liquid and a vapour phase, i.e., by distillation. In this case, the concentrated solution of high osmotic pressure is introduced into the high pressure inlet 204 of the PRO membrane unit 202; and the dilute solution of lower osmotic pressure is introduced into its low pressure inlet 206. As an example, there could be used ethanol dissolved in $CCl_2F_2$. The pressurized mixed solution exits from unit 202 via outlet 214. A small fraction of the dilute solution exits as a flushing solution via outlet 216, whereupon it is pressurized by pump 222 and then mixed with the pressurized mixed solution at inlet 218 of the separator unit 220.

Separator unit 220 is a distillation device receiving heat from the heat source 224, separating the inletted mixture into a pressurized concentrated solution, and a pressurized distillate vapour. The pressurized concentrated solution is recycled back to the high-pressure inlet 204 of the PRO membrane unit 202 via outlet 228 and circulating pump 230. The pressurized distillate vapor exits via outlet 232, is condensed in condensor 233, and is then depressurized by the hydroturbine 234 before it is recycled back to the low pressure inlet 206 of the PRO membrane unit 202. Preferably, a cooler 235 is provided immediately after the condenser 233 to prevent reflashing of the condensed distillate in the hydroturbine 234.

Figure 3A:
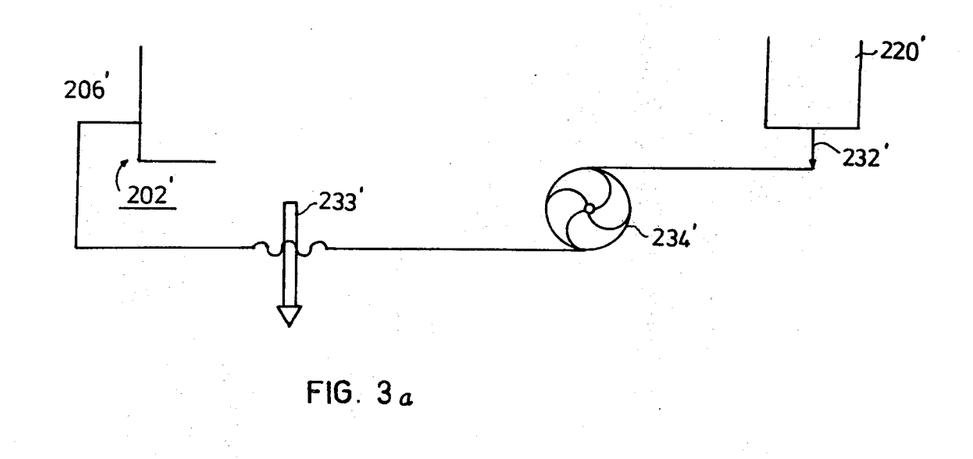
FIG. 3a illustrates a variation in the heat-engine of FIG. 3.

FIG. 3a illustrates a variation, wherein the pressurized distillate vapour exiting from the distillation unit 220' via outlet 232' is first depressurized, as by the use of a vapour turbine 234' instead of the hydroturbine 234, and is then condensed in condenser 233' before being recycled back to the low pressure inlet 206' of the PRO membrane unit 202'.

Figure 4:
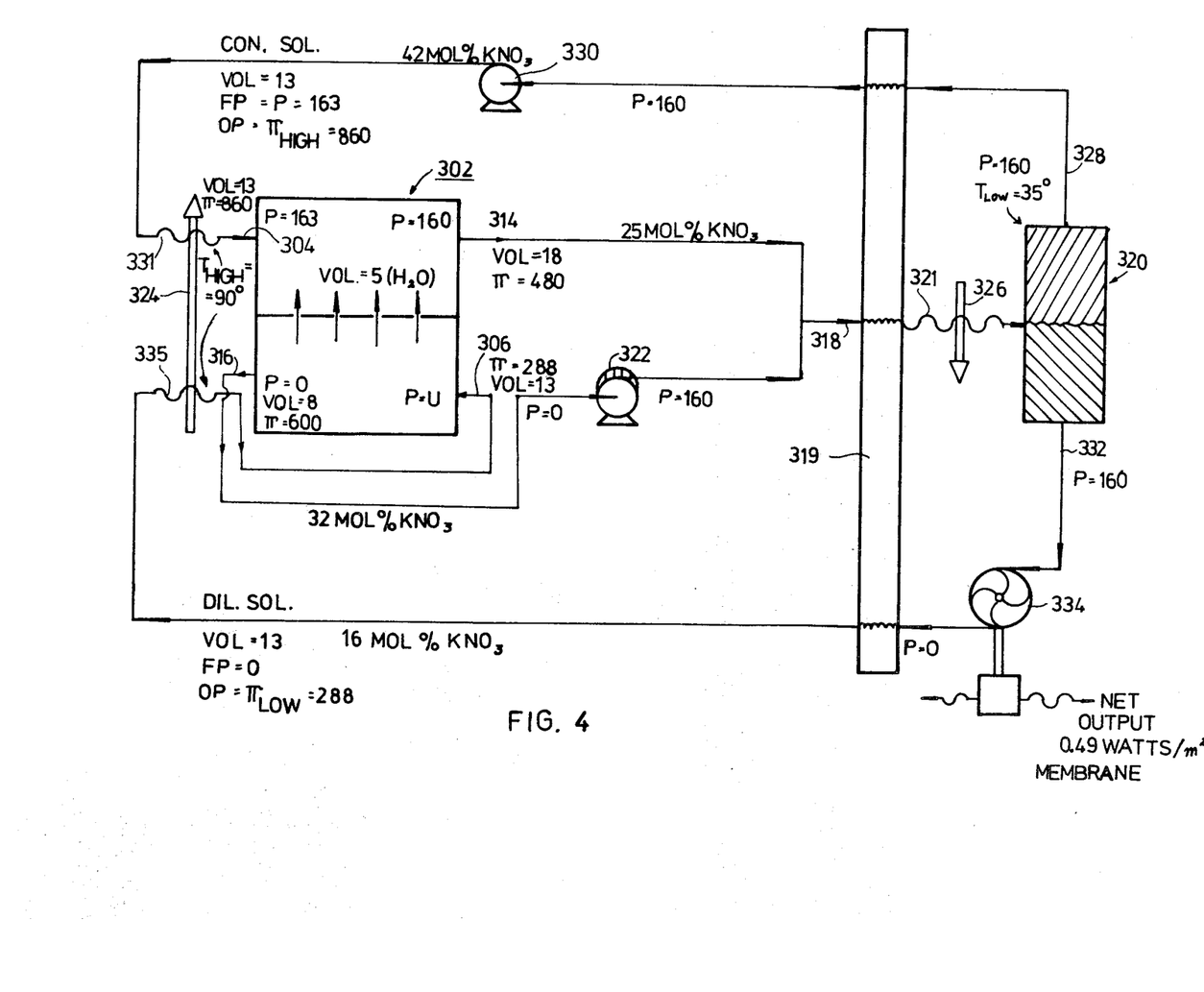
FIG. 4 illustrates a PRO heat-engine similar to that of FIG. 2 except involving counter-current flow of the concentrated and dilute solutions through the PRO membrane unit.

The system illustrated in FIG. 4 is similar to that of FIG. 2, except that it involves counter-current flow of the concentrated and dilute solutions through the PRO membrane unit. Thus, in the heat-engine of FIG. 4, the concentrated solution is introduced into the high pressure inlet 304 of the PRO membrane unit 302 at one side of the latter unit, and the diluted solution is introduced into the low pressure inlet 306 at the opposite side of the PRO membrane unit. A counter-current flow of the two liquids is thus produced through the PRO membrane unit 302. The concentrated solution, and the portion of the dilute solution permeating through the membrane, exit via outlet 314. The flushing solution exits via outlet 316 and is pressurized by pump 322 before being added to the pressurized mixed solution at point 318 upstream of the heat-exchanger 319.

The remainder of the system is substantially the same as described above with respect to FIG. 2, the pressurized mixed and flushing solutions being cooled in heat-exchanger 319 and finally cooled to their minimum temperature in cooler 321 before being passed into the separator 320 where they are separated into a pressurized slurry exiting from the separator via outlet 328, and a pressurized dilute brine exiting from the separator via outlet 332. The pressurized slurry is partially heated in heat-exchanger 319 and is then fed via circulating pump 330 to heater 331 wherein it is heated by the heat source 324 to its highest temperature before being reintroduced into the high pressure inlet 304 of the PRO membrane unit 302. The pressurized dilute solution leaving separator 320 via its outlet 332 is depressurized by hydroturbine 334, partially heated in heat-exchanger 319, and then further heated in heater 335 by the heat source 324 before it is recycled back into the low-pressure inlet 306 of the PRO membrane unit 302.

An advantage in using counter-current flow through the PRO membrane unit is that it is possible to produce a higher difference in osmotic pressure between the two liquids across the membrane. This permits a higher hydraulic pressure thereby producing higher thermal efficiency and lower energy cost.

FIG. 4 includes legends illustrating one example of a system that could be used. In this example, the membranes are of hollow fibre type. The value of watts per square meter membrane are based on water permeation flux of 0.01 $m^3/m^2$ day; this is a conservative (low) value. In calculating the output power, friction losses and inefficiencies of rotating components are taken into account. The assumed mechanical efficiency of the pumps and the hydroturbine is 90%, and of the generator is 98%. Overall plant mechanical efficiency is assumed to be 50%. The calculations are made as if the $KNO_3$ does not ionize. This is the conservative approach. To the extent that it does ionize, the $\pi$ and P values would be higher, as would also be the watts per square meter of membrane. Thermal efficiency would increase, and energy costs decrease.

Other liquid-solid system which could be used in FIGS. 2 and 4 include sodium laurate, myristate, or palmitate, as well as their sulfonate and sulfate derivatives.

Many other variations, modifications and applications of the invention will be apparent.

What is claimed is:

1. A method of generating power, comprising:
   (A) introducing at a high hydraulic pressure a first liquid, constituting a concentrated solution, of a high osmotic pressure into a first pathway which is at least partially defined by one face of a semi-permeable membrane;
   (B) introducing at a lower hydraulic pressure a second liquid, constituting a dilute solution, of a lower osmotic pressure into a second pathway which is at least partially defined by the opposite face of the semi-permeable membrane;
   (C) maintaining the hydraulic pressures of the liquids on the opposite faces of the membrane at a pressure difference which is less than the osmotic pressure difference between the liquids, to effect, by Pressure-Retarded-Osmosis, the passage of a part of the solvent of the dilute solution through the semi-permeable membrane, forming a pressurized mixed solution of greater volume than said concentrated solution introduced into said first pathway;
   (D) and converting the potential energy stored in the pressurized mixed solution to useful energy by:
   (i) pressurizing a quantity of liquid taken as a flushing solution from the second pathway at a point downstream of the semi-permeable membrane and adding same to the pressurized mixed solution;
   (ii) thermally separating said pressurized mixed and flushing solutions to regenerate said concentrated and dilute solutions while both are pressurized;
   (iii) recycling said pressurized, regenerated concentrated solution back through said first pathway;
   (iv) depressurizing said pressurized, regenerated dilute solution to produce useful energy; and
   (v) recycling the depressurized dilute solution back through said second pathway.

2. The method according to claim 1, wherein the thermal separation is effected by using, for the concentrated and dilute solutions, two partially-miscible liquids whose miscibility is a function of temperature.

3. The method according to claim 2, wherein the mixed and flushing solutions are cooled before being separated into the regenerated concentrated and dilute solutions, the regenerated concentrated and dilute solutions being re-heated after being separated and before being recycled back into the semi-permeable membrane.

4. The method according to claim 2, wherein the mixed and flushing solutions are heated before being separated into the regenerated concentrated and dilute solutions, the regenerated concentrated and dilute solutions being cooled after being separated and before being recycled back into the semi-permeable membrane.

5. The method according to claim 1, wherein the thermal separation is effected by using, for the concentrated and dilute solutions, a liquid and a solid whose solubility in the liquid is a function of temperature.

6. The method according to claim 1, wherein the thermal separation is effected by distillation.

7. The method according to claim 6, wherein the distillate from the distillation is first condensed, then depressurized, and then recycled back into the semi-permeable membrane.

8. The method according to claim 6, wherein the distillate from the distillation is first depressurized, then condensed, and then recycled back into the semi-permeable membrane.

9. A heat-engine for generating power, comprising:
   (A) a semi-permeable membrane unit having a first pathway therethrough defined by one face of a semi-permeable membrane, and a second pathway therethrough defined by the opposite face of the semi-permeable membrane;
   (B) means for introducing at a high hydraulic pressure a first liquid, constituting a concentrated solution, of a high osmotic pressure into said first pathway;
   (C) means for introducing at a lower hydraulic pressure a second liquid, constituting a dilute solution, of a lower osmotic pressure into said second pathway;
   (D) means for maintaining the hydraulic pressures of the liquids on the opposite faces of the membrane at a pressure difference which is less than the osmotic pressure difference between the liquids, to effect, by Pressure-Retarded-Osmosis, the passage of a part of the solvent of the dilute solution through the semi-permeable membrane, forming a pressurized mixed solution of greater volume than said concentrated solution introduced into said first pathway;
   (E) and means for converting the potential energy stored in the pressurized mixed solution to useful energy, said latter means including:
   (i) pressurizing means for pressurizing a quantity of liquid taken as a flushing solution from the second pathway at a point downstream of the semi-permeable membrane unit;

(ii) thermal separation means for separating said pressurized mixed and flushing solutions to regenerate said concentrated and dilute solutions, both pressurized;

(iii) recycling means for recycling said pressurized, regenerated concentrated solution back through said first pathway through the semi-permeable membrane unit;

(iv) depressurizing means for depressurizing said regenerated dilute solution to produce useful energy; and (v) recycling means for recycling the latter dilute solution back through the second pathway through the semi-permeable membrane unit.

10. The heat-engine according to claim 9, wherein said thermal separation means (E) (ii) includes means for cooling the mixed and flushing solutions before being separated into the regenerated concentrated and dilute solutions, and means for re-heating the regenerated concentrated and dilute solutions after being separated and before being recycled back into the semi-permeable membrane unit.

11. The heat-engine according to claim 9, wherein said thermal separation means (E) (ii) includes means for heating the mixed and flushing solutions before being separated into the regenerated concentrated and dilute solutions, and means for cooling the regenerated concentrated and dilute solutions after being separated and before being recycled back into the semi-permeable membrane.

12. The heat-engine according to claim 9, wherein said depressurizing means (E) (iv) comprises a hydroturbine.

13. The heat-engine according to claim 9, wherein said thermal separation means (E) (ii) is a distillation unit.

14. The heat-engine according to claim 13, wherein said depressurizing means (E) (iv) comprises a condenser condensing the distillate and a hydroturbine depressurizing the condensed distillate before the same is recycled back through said second pathway as the regenerated dilute solution.

15. The heat-engine according to claim 13, wherein said depressurizing means (E) (iv) comprises a vapor turbine depressurizing the distillate and a condenser condensing the depressurized distillate before the same is recycled back through said second pathway as the regenerated dilute solution.

* * * * *